April 24, 1928.  1,667,596
H. KAPOTA
FRUIT PEELER
Filed Sept. 11, 1922
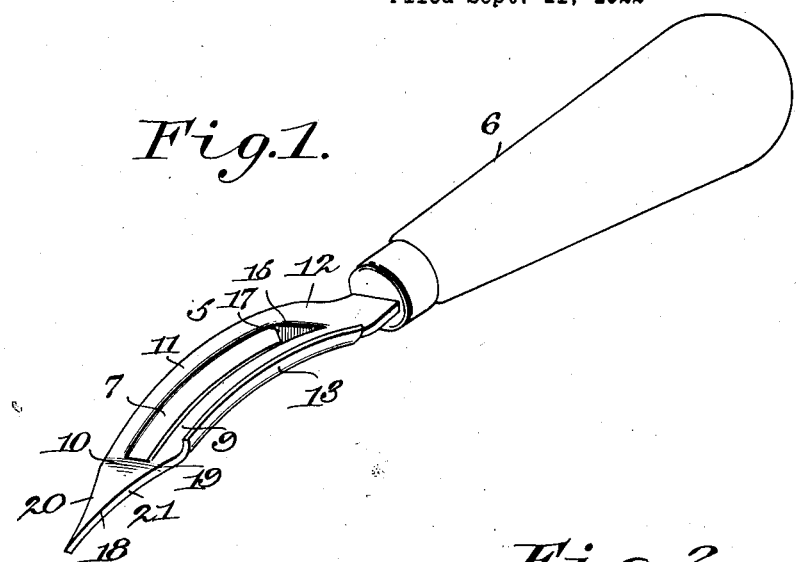
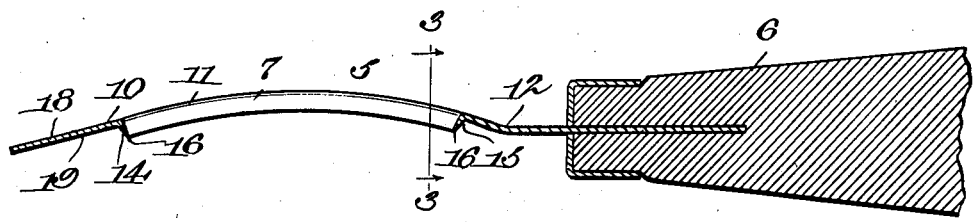
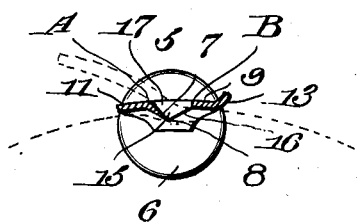
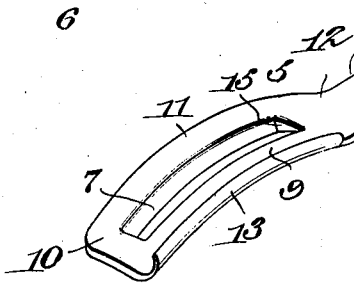
Hyman Kapota,
INVENTOR
BY *Victor J. Evans*
ATTORNEY
WITNESS *Fred W Ely*

Patented Apr. 24, 1928.

1,667,596

UNITED STATES PATENT OFFICE.

HYMAN KAPOTA, OF NEW YORK, N. Y.

FRUIT PEELER.

Application filed September 11, 1922. Serial No. 587,453.

This invention relates to fruit peelers.

An important object of my invention is to provide a fruit peeler which can be successfully used for peeling oranges, pears, apples, etc.

A further object of my invention is to provide an implement of this character which will adapt itself to spherically and irregularly curved fruit and one which is constructed so that the peeling may be uniformly cut both in width as well as depth.

A further object of the invention is to provide an implement of this character which will be simple of construction, positive of action and capable of operation with greatest simplicity.

A further object of the invention is to provide an instrument of this character which may be satisfactorily used by children or by persons of impaired faculties such as convalescents or persons who are near sighted, the implement being designed whereby it can be consistently used without requiring adjustment and further without the necessity of undue force during the peeling operation, which would otherwise render the implement impractical when used in connection with ripe fruit such as pears, or tender skinned fruit.

A further object of the invention is to provide an implement of this character which will be free of mechanical parts, recesses, crevices or the like which might act to harbor decomposed portions of fruit, the construction of the implement being such that will enable it to be thoroughly cleaned and maintained in a sanitary condition.

A still further object of the invention is to provide an implement of this character wherein means are provided for dispatching the peeling away from the implement during the peeling operation.

A still further object of the invention is to provide a device of this character which can be easily actuated to remove the skin or peel uniformly as to width and thickness without possibility of gauging the fruit and in a manner that will avoid undue waste of the fruit.

With the above and other objects in view which will appear as the nature of the invention is better understood, the same consists in the improved construction and novel arrangements of parts which will hereinafter be fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

Figure 1, is a perspective view of the implement.

Figure 2, is a longitudinal section therethrough.

Figure 3, is a transverse section on the line 3—3 of Figure 2.

Figure 4, is a perspective view of a modified form of the implement.

With reference to the accompanying drawing 5 represents a body member provided with a suitable handle 6. The body member 5 is curved longitudinally and transversely to adapt itself to spherical fruit such as oranges, apples, or irregularly curved fruit such as pears. Formed in the length of the member 5, and conforming with the curvature thereof is a blade 7 which extends downward from the member 5, at a suitable angle thereto. The blade extends forwardly or toward the operator and same may be either straight or curved transversely and provided with a beveled cutting edge 8, as shown in Figure 3.

The formation of the member 5 is such that same is provided with walls 9, 10, 11 and 12 which are adapted to freely and constantly rest against the fruit and to act as guards or stops to limit penetration of the blade 7 in the fruit during the peeling operation. The guard wall 11 prevents the member 5 from tilting backwards and maintains a true cutting relation of the blade 7 to the fruit at all times and same avoids uneven cutting of the skin or peel. The guard 9 prevents the member 5 from tilting forward and positions the blade with relation to the fruit so as to prevent it from cutting the skin or peel unevenly and from catching in the fruit in such way that might cause gouging thereof. The guard 9 is provided with an upwardly and forwardly curved surface 13, which acts to smoothly guard the device over irregular elevations in the fruit and prevent it from becoming accidentally caught in the soft fruit.

The blade 7 is provided at its ends with connecting walls 14 and 15 provided with forwardly disposed sharp cutting edges 16.

By means of these walls, the blade is assisted in its cutting action and a strip of skin of even width may be uniformly cut from the front. These walls are exceptionally useful when the device is used to peel oranges or thick skinned fruit. In some instances, when carrying my invention into practice, I may omit these walls.

Through the formation of the blade 7 which is upstruck from the member 5, the latter is provided with a slot 17 which extends slightly more than the full length of the blade 7, and the width of said slot is slightly in excess of the width of said blade. The distance between the points A and B of the slot 17 is greater than the cutting depth, of the blade as shown in Figure 3 and incident thereto this distance as thus described is greater than the thickness of the peel or skin of the fruit and allows for free outward and continuous passage of the skin through the slot as the peeling operation proceeds.

By forming the blade 7 with a sharp cutting edge and by inclining same downward and forward as described, the blade may be passed under the skin of the fruit with the least application of force. By uniformly tilting the blade at the angle referred to and as shown, same is permitted to extend into the fruit for an even depth and same is maintained in proper relation to the fruit by the aforesaid guard walls 9, 10, 11 and 12.

The free end of the member 5 is pointed at 18 and provided with a blade 19 having a blunt edge 20 and a sharp inwardly curved cutting edge 21, the latter extending slightly into the body member 5. The curvature of this cutting edge 21 is such as to conform with the curvature of the pit of the fruit in line with the core thereof when the implement is used for peeling apples, pears or the like. It is also useful in removing eyes and defective parts of the fruit and to cut the skin at points where the blade 7 is unable to reach. The point of this blade may be employed to pick up the severed skin which may tend to adhere to the fruit during the peeling operation.

The entire implement may be formed of a single piece of material or the equivalent thereof.

In Figure 4, the implement is the same as the one shown in Figures 1 to 3 inclusive, except that same is not provided with the supplemental blade 19.

It will of course be understood that the device can be constructed of any suitable well known material which will permit the device to function as aforesaid; that it may be made of any suitable size to meet varying requirements, and that various changes, and proportions can be resorted to when desired within the scope of the appended claims.

While I have particularly referred to the use of the implement as a fruit peeler, I find it equally useful for peeling various forms of vegetables such as carrots, potatoes, radishes, beets, turnips etc., and according to the use to which the implement is put, I may make such desirable alterations in the construction and size of the implement that will cause it to adapt itself to varying requirements. In peeling thin skinned fruits and vegetables, the angle of the cutting blade 7 may be changed so that the vegetable can be satisfactorily peeled without undue waste.

What is claimed as new is:—

1. A fruit peeling implement comprising a member curved to form a concavity, the curvature of which conforms to the general curvature of the fruit, a longitudinally curved blade extending from said member downwards and forwards and having its cutting edge within said concavity, said cutting edge being concentric to the longitudinal curvature of the major portion of the blade, guard walls bounding the blade adapted to come in intimate contact with the fruit, so as to cause said blade to maintain an angle and cut the peel or skin of the fruit of a uniform thickness approximating the depth, and of a width approximating the length of the blade.

2. A fruit peeling implement including a member having a concavity, the curvature of which conforms to the general curvature of the fruit, a longitudinally curved blade extending from said member into said concavity downwards and forwards, and having its cutting edge concentric to the longitudinal curvature of the major portion of the blade, said member having a slot extending the full length of the blade, the distance between one wall of the slot and an adjacent surface of the blade being in excess of the depth of the blade.

3. A fruit peeling implement including a member, a slot provided in the longitudinal length thereof, a longitudinally curved blade formed on the member and inclined downward and forward with respect thereto, and being approximately coextensive with the length of the slot, and auxiliary angular blades connecting the end sides of said main blade with adjacent sides of a wall forming the slot and having continuations of the main cutting edge.

4. A fruit peeling implement including a member curved to form a concavity, a longitudinally curved blade extending from said member downwards and forwards and having its cutting edge in said concavity, said member having a slot extending the full length of the blade, the distance between one wall of the slot and an adjacent surface of the blade being in excess of the depth of the blade, and guard walls disposed on opposite sides of the slot adapted to firmly rest against the fruit, so as to maintain a substantially constant angle and limit penetration therein of the aforesaid blade, one of said walls extending in parallel relation to the blade and being curved upwardly and forwardly with respect thereto.

5. An implement of the class described comprising a member having a concavity curved to conform to the general curvature of the fruit, a longitudinally curved blade extending from said member downwards and forwards and having its cutting edge within said concavity, said cutting edge being concentric to the longitudinal curvature of the major portion of the blade, said member having a slot approximately coextensive with the blade and occupying a position at one side thereof, and a pointed auxiliary blade having an inwardly curved cutting edge extending from the end of an adjacent wall to the end of the point.

6. A fruit peeling implement including a member curved to form a concavity, a longitudinally curved blade extending from said member downwards and forwards and having its cutting edge in said concavity, said member having a slot extending the full length of the blade, and guard walls disposed on opposite sides of the slot adapted to firmly rest against the fruit, so as to maintain a substantially constant angle and limit penetration therein of the aforesaid blade, one of said walls extending in parallel relation to the blade and being curved upwardly and forwardly with respect thereto.

7. A fruit peeling implement comprising a member forming a concavity of a curvature similar to the general curvature of the fruit, and a longitudinally curved blade extending from said member downwards and forwards and having its cutting edge within said concavity concentric to the longitudinal curvature of the major portion of the blade.

8. A fruit peeling implement including a member having a concavity, a longitudinally curved blade extending downwards and forwards and having its cutting edge within said concavity concentric to the longitudinal curvature of the major portion of the blade, and guard walls bounding the blade adapted to firmly rest against the fruit so as to limit penetration therein of the aforesaid blade and maintain same at a substantially constant angle.

In testimony whereof I have affixed my signature.

HYMAN KAPOTA.